United States Patent [19]

Appel et al.

[11] 4,019,386

[45] Apr. 26, 1977

[54] UNITIZED ELECTRODE ASSEMBLY FOR ELECTROMAGNETIC FLOWMETER

[75] Inventors: Eggert Appel, Dransfeld; Gottfried Geisler, Gottingen; Albert Seebode, Rosdorf, all of Germany

[73] Assignee: Fischer & Porter Co., Warminster, Pa.

[22] Filed: Jan. 20, 1976

[21] Appl. No.: 650,686

[30] Foreign Application Priority Data

Feb. 8, 1975    Germany .......................... 2505427

[52] U.S. Cl. .......................................... 73/194 EM
[51] Int. Cl.² .......................................... G01F 1/58
[58] Field of Search .............................. 73/194 EM

[56] References Cited

UNITED STATES PATENTS

| | | | |
|---|---|---|---|
| 3,489,007 | 1/1970 | Cushing | 73/194 EM |
| 3,839,912 | 10/1974 | Schmoock | 73/194 EM |

FOREIGN PATENTS OR APPLICATIONS

| | | | |
|---|---|---|---|
| 2,040,682 | 2/1972 | Germany | 73/194EM |
| 1,072,521 | 6/1967 | United Kingdom | 73/194 EM |

Primary Examiner—James J. Gill

[57] ABSTRACT

An electromagnetic flowmeter capable of measuring fluids having any degree of conductivity, including fluids having dielectric properties. The fluid to be measured is fed through a dielectrically-lined flow tube to intersect a transverse magnetic field, thereby inducing a voltage in a pair of planar detecting electrodes disposed within the dielectric lining. Each detecting electrode and an associated planar shielding electrode are unitized in an assembly wherein the electrodes are embedded in a liner segment formed of rigid dielectric material, connections to the electrodes being made by means of a coaxial line extending radially through an opening in the flow tube, the line having an outer conductor attached to the shielding electrode and an inner conductor attached to the detector electrode, the space between the line conductors being filled with the same dielectric material as that of the segment.

5 Claims, 1 Drawing Figure

U.S. Patent
April 26, 1977
4,019,386
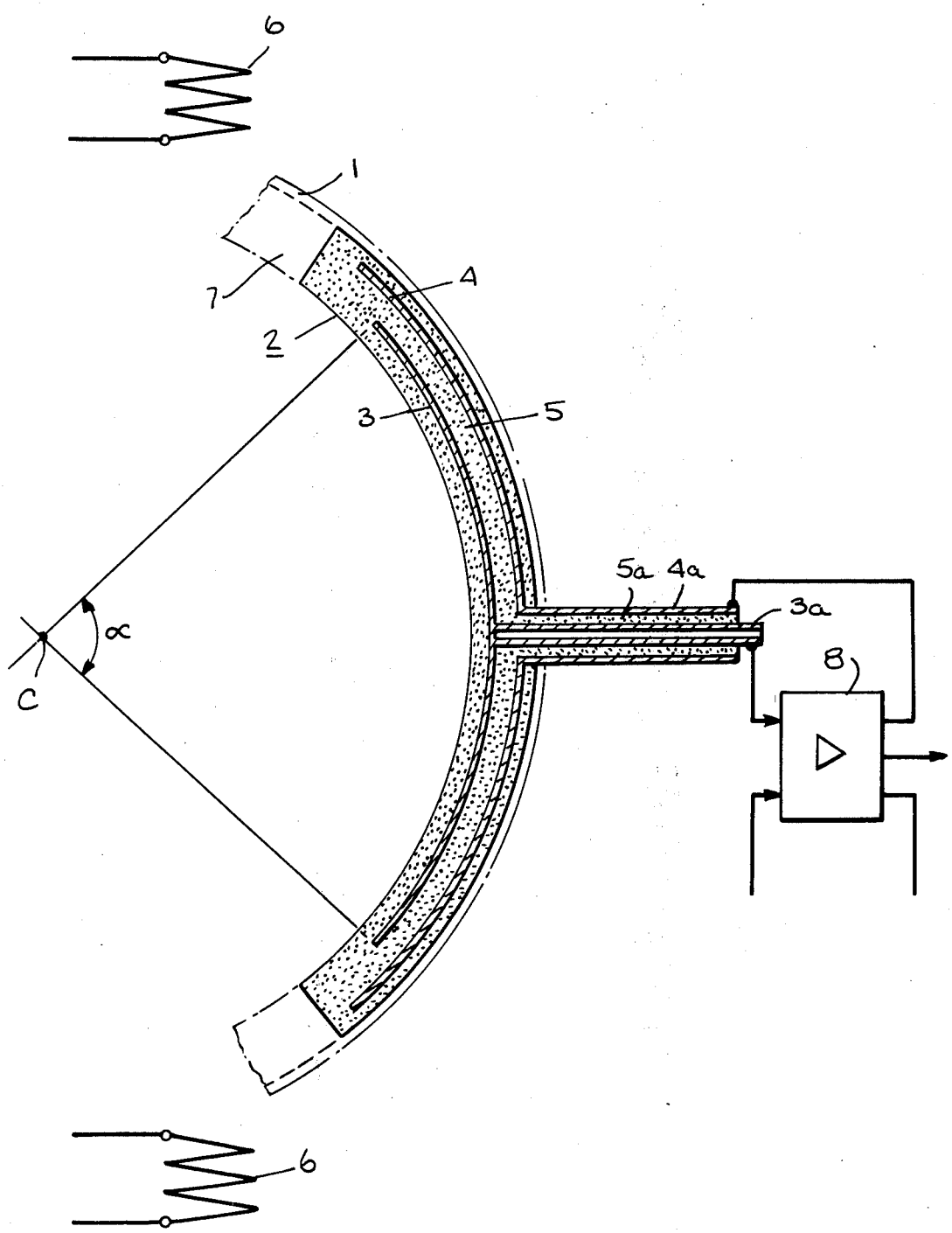

UNITIZED ELECTRODE ASSEMBLY FOR ELECTROMAGNETIC FLOWMETER

BACKGROUND OF INVENTION

This invention relates generally to electromagnetic flowmeters, and in particular to a unitized electrode assembly for such flowmeters.

In an electromagnetic flowmeter, the liquid whose flow rate is to be measured is conducted through a flow tube provided with a pair of diametrically-opposed electrodes, a magnetic field normal to the direction of flow being established by an electromagnet. When the flowing liquid intersects this field, a signal is induced therein which is transferred to the detecting electrodes. This signal, which is proportional to the average velocity of the liquid and hence to its average volumetric rate, is then amplified and processed to actuate a recorder or indicator. The magnetic field may be either direct or alternating, for in either event the amplitude of signal induced in the liquid passing through the field will be a function of its flow rate.

In a flowmeter of this type disclosed in the German patent publication DT-AS 1,963,901, the flow tube is lined with dielectric material and is provided with at least two planar electrodes having a relatively large area, the electrodes being in electrically-conductive contact with the liquid passing through the tube.

The main concern of the present invention is with flowmeters of the type disclosed in German Patent No. 1,473,041 and in U.S. Pat. No. 3,274,831, wherein a flowmeter energized by alternating-current field is provided with two or more planar detector electrodes of large area and a shielding electrode of even larger area cooperating with each detector electrode. For measuring dielectric fluids, the electrodes are covered by the dielectric lining of the flow tube and are thereby protected from the fluid. This lining, together with the dielectric of the fluid, constitutes the dielectric of a capacitor whose plates are formed by the planar measuring electrodes. A similar arrangement is disclosed in the pending U.S. application Ser. No. 617,982, filed Sept. 29, 1975, whose entire disclosure is incorporated herein by reference.

In the arrangement disclosed in U.S. Pat. No. 3,274,831 and in German Patent No. 1,473,041, the dielectric liner for the flow tube is constituted by two distinct cylindrical bodies, one being received within the other. The faces of the detecting electrodes lie against the outer surface of the first dielectric cylinder. The rear and sides of these electrodes adjoin the second dielectric cylinder, the shielding electrodes being embedded in the second cylinder. Connections to these electrodes are made by way of a coaxial line through an opening in the flow tube and through an opening in the second dielectric cylinder of the liner, the coaxial line leading to external detector amplifiers.

Experience has shown that in an arrangement of this known type, because of the extremely high impedance of the capacitively-coupled detecting electrodes, pressure and temperature changes, flow tube vibrations and other environmental influences give rise to a considerable degree of error which is not compensable.

It has been found that a major cause of such error or signal distortion are microphonic effects which produce crevices, fine cracks or fissures between the electrode surfaces and the cylinders of the dielectric liner, or which result in slight motion of the electrode connections with respect to the magnetic or electric fields of the exciter circuit of the flowmeter. These motions create spurious signals which render accurate flow rate measurement virtually impossible.

SUMMARY OF INVENTION

In view of the foregoing, the main object of the present invention is to provide a unitized electrode assembly for an electromagnetic flowmeter which ensures accurate flow rate measurement.

More specifically, it is an object of this invention to provide a rigid and highly stable unitized electrode assembly whose detecting and shielding electrodes are embedded in a common dielectric liner segment, which electrodes are connected both mechanically and electrically to the conductors of a coaxial line filled with a homogeneous dielectric material which is the same as and is integral with the material of the segment.

A significant feature of an assembly in accordance with the invention is that the structure is highly resistant to the formation of internal fissures or cavities. Moreover, displacement of the conductors of the coaxial line connected to the electrodes relative to the magnetic and electric field of the exciter circuit is obviated, whereby the generation of spurious signals as a result of such movement is eliminated.

Also an object of this invention is to provide a unitized electrode assembly which may be manufactured without difficulty and at relatively low cost.

Briefly stated, these objects are attained in a unitized electrode assembly for an electromagnetic flowmeter, which assembly includes a liner segment formed of homogeneous dielectric material having a curvature conforming to the inner contour of the flow tube in which it is installed.

Embedded in the dielectric liner segment are a planar detecting electrode and a planar shielding electrode, the electrodes being concentrically arranged and having arcuate forms conforming to the curvature of the segment. Extending radially through an opening in the flow tube to provide separate electrical connections to the electrodes is a coaxial line having an inner conductor which terminates at the detecting electrode and an outer conductor which terminates at the shielding electrodes, the space between these conductors being filled with the same dielectric material as that forming the segment whereby the resultant structure is rigid and dimensionally highly stable.

OUTLINE OF DRAWING

For a better understanding of the invention as well as other objects and further features thereof, reference is made to the following detailed description to be read in conjunction with the annexed drawing whose single FIGURE illustrates, in cross-section, one of the pair of the unitized electrode assemblies incorporated in an electromagnetic flowmeter.

DESCRIPTION OF INVENTION

Referring now to the drawing, there is shown an electromagnetic flowmeter in accordance with the invention adapted to produce an output signal whose amplitude is proportional to the flow rate of the liquid being measured.

The flowmeter includes a metallic flow tube 1 through which the fluid to be metered is conducted. An electromagnet provided with excitation coils 6 disposed on opposite sides of the tube acts to establish a magnetic field transverse to the direction of flow. The interior of flow tube 1 is provided with a cylindrical liner 7 of a suitable dielectric material.

The flowmeter is provided with a pair of unitized electrode assemblies, generally designated by numeral 2, only one of which is illustrated, the assemblies being mounted at diametrically-opposed positions within the flow tube. Each assembly is constituted by a segment 5 of rigid homogeneous dielectric material whose curvature conforms to the inner contour of the flow tube, a detector electrode 3 and a shielding electrode 4 embedded therein.

Detector electrode 3 is formed of planar conductive metal or foil and has an arcuate formation conforming to the curvature of the segment. Shielding electrode 4, which is disposed behind detector electrode 3 and is concentric therewith, is formed of planar conductive metal or foil having an arcuate formation conforming to the curvature of the segment, the area of the shielding electrode being larger than that of the detecting electrode.

Electrical connections to the electrode are made by means of a rigid coaxial line which extends radially through an opening in flow tube 1, the line having an outer tubular conductor 4a which terminates at and is attached physically and electrically to shielding electrode 4 through which the inner conductor 3a of the line passes, the inner conductor terminating at and being physically and electrically attached to the detecting electrode 3.

The interior space between the inner and outer conductors of the coaxial line is filled with the homogeneous dielectric material 5a which is the same as the material which forms liner segment 5 and is integral therewith and is free of cavities, whereby the entire electrode assembly constitutes a unitized rigid structure.

The angle $\alpha$ defined between the outer edges of the arcuate detecting electrode 3 and the center C of the flow tube is made such as to optimize the detector signal by adapting the weighting factor W to the reciprocal proportional electromagnetic field B. As explained in greater detail in the patent of Ketelson, U.S. Pat. No. 3,373,608, the weighting factor is a measure of the effect of the signal generated at each point in the plane containing the electrode axis on the total signal measured at the detecting electrodes.

The unitized electrode assembly may in practice be manufactured by vacuum sealing techniques which allow easy assembly into the blank metal flow tube. The homogeneous dielectric guarantees a cavity-free electrode structure with dimensionally stable connections to the electrodes. In order to obtain a smooth liner after mounting the electrode assemblies within the blank flow tube, the liner spaces between liner segments 5 may be filled with the same dielectric material (e.g., a hardenable cast resin) by use of vacuum techniques or rotational molding.

As is well known, a signal is induced in the liquid whose flow intersects the magnetic field produced by coils 6, the signal being transferred to detecting electrodes 3 to produce a primary output signal that reflects the flow rate. The output signal from the primary is applied to a secondary, including an amplifier 8 having a high impedance input connected to the inner conductor 3a of the coaxial line connected to detecting electrodes 3 of the pair of electrode assemblies, only one of which is illustrated. The outer conductors 4a of the line serve to connect the output of amplifier 8 to the shielding electrodes 4 when these electrodes are isolated from flow tube 1. A more detailed descrption of the secondary may be found in the copendng application Ser. No. 617,982, filed Sept. 29, 1975.

While there has been shown and described a preferred embodiment of a unitized electrode assembly for electromagnetic flowmeter in accordance with the invention, it will be appreciated that many changes and modifications may be made therein without, however, departing from the essential spirit thereof.

We claim:

1. In an electromagnetic flowmeter having a dielectrically-lined flow tube through which is conducted the fluid to be metered, said tube having diametrically-opposed openings, the fluid intercepting a magnetic field to induce a signal in the detecting electrodes of a pair of diametrically-disposed unitized electrode assemblies, each assembly comprising:
    A. a liner segment having a curvature conforming to the inner contour of the flow tube and formed of rigid homogeneous dielectric material;
    B. a planar detector electrode embedded in said segment, said electrode having an arcuate form conforming to the curvature of said segment;
    C. a planar shielding electrode embedded in said segment behind said detector electrode and in spaced relation thereto, said shielding electrode having an arcuate form conforming to the curvature of said segment; and
    D. a coaxial line extending radially through one of said openings in said flow tube to provide separate electrical connections to said electrodes, said line having an inner conductor which terminates at and is physically and electrically attached to said detecting electrode and an outer conductor which terminates at and is physically and electrically attached to said shielding electrode, the interior space between the conductors being filled with the same dielectric material as that of said segment and being integral therewith to form a unitized rigid assembly structure which is dimensionally stable, the structure being installable within said tube by inserting the free end of said coaxial line through said one opening.

2. An assembly as set forth in claim 1, wherein said shielding electrode has a greater area than said detecting electrode.

3. A flowmeter assembly as set forth in claim 1, wherein said dielectric material is formed by a hardenable cast resin.

4. A flowmeter assembly as set forth in claim 1, wherein the liner in said flow tube in the regions between the dielectric segments of the assemblies is formed of the same dielectric material and has the same curvature and thickness.

5. A flowmeter assembly as set forth in claim 1, wherein the angle between the outer edges of the detecting electrode and the center of the flow tube is such as to optimize the detector signal by adapting the weighting factor to the reciprocal proportional magnetic field.

* * * * *

UNITED STATES PATENT AND TRADEMARK OFFICE
CERTIFICATE OF CORRECTION

PATENT NO. : 4,019,386
DATED : April 26, 1977
INVENTOR(S) : Eggert Appel, Gottfried Geisler, Albert Seebode It is certified that error appears in the above-identified patent and that said Letters Patent are hereby corrected as shown below:

Column 3, line 27 "trode 4 through" should have read -- trode 4. Outer conductor 4a surrounds an opening in shielding electrode 4 through --

Column 4, line 6 "descrption" should have read -- description --

Signed and Sealed this

Twenty-eighth Day of June 1977

[SEAL]

Attest:

RUTH C. MASON
*Attesting Officer*

C. MARSHALL DANN
*Commissioner of Patents and Trademarks*